United States Patent [19]

Grosse et al.

[11] 4,392,865

[45] Jul. 12, 1983

[54] HYDROCARBON-WATER FUELS, EMULSIONS, SLURRIES AND OTHER PARTICULATE MIXTURES

[75] Inventors: Aristid V. Grosse, Haverford; Norman H. Cherry, Philadelphia, both of Pa.

[73] Assignee: Lanko, Inc., Philadelphia, Pa.

[21] Appl. No.: 112,507

[22] Filed: Jan. 16, 1980

Related U.S. Application Data

[63] Continuation-in-part of Ser. No. 771,272, Feb. 23, 1977, abandoned.

[51] Int. Cl.[3] .......................... C10L 1/32; C01L 1/14

[52] U.S. Cl. .......................................... 44/51; 44/62; 252/49.3; 252/49.5; 252/309; 252/312

[58] Field of Search ...................... 44/51, 62; 252/309, 252/312, 49.3, 49.5; 137/13; 138/146; 524/52, 475, 219

[56] References Cited

U.S. PATENT DOCUMENTS

| | | | |
|---|---|---|---|
| 1,440,356 | 12/1922 | Morrell | 252/49.5 |
| 1,480,589 | 1/1924 | Wondruschka et al. | 252/49.5 |
| 2,015,043 | 9/1935 | Stratford | 252/49.5 |
| 2,194,218 | 3/1940 | Pickeson | 252/49.5 |
| 3,617,095 | 11/1971 | Lissant | 252/309 |
| 3,768,565 | 10/1973 | Persinski et al. | 137/13 |
| 3,852,234 | 12/1974 | Venema | 260/29.6 H |
| 3,860,521 | 1/1975 | Aepli et al. | 252/49.3 |
| 3,943,060 | 3/1976 | Martin et al. | 137/13 |
| 3,954,627 | 5/1976 | Dreher et al. | 252/312 |
| 4,022,731 | 5/1977 | Schmitt | 260/29.6 MH |
| 4,160,370 | 7/1979 | Hacias | 252/49.5 |
| 4,190,069 | 2/1980 | Krantz | 137/13 |
| 4,225,447 | 9/1980 | Law et al. | 252/49.5 |
| 4,274,973 | 6/1981 | Stanton et al. | 252/49.5 |

FOREIGN PATENT DOCUMENTS

| | | | |
|---|---|---|---|
| 2749302 | 5/1978 | Fed. Rep. of Germany | 137/13 |
| 1315131 | 12/1962 | France | 44/51 |

OTHER PUBLICATIONS

*Hackh's Chemical Dictionary,* p. 616, Grant, 1972, New York, N.Y.

*The Merck Index,* 8th Ed., p. 946, Pub. 1968, Merck & Co.

*Primary Examiner*—Delbert E. Gantz
*Assistant Examiner*—Raymond Covington
*Attorney, Agent, or Firm*—Caesar, Rivise, Bernstein & Cohen, Ltd.

[57] ABSTRACT

The first aspect of the invention involves stable emulsions of hydrocarbons and water using a combination of a low molecular weight agent and a high molecular weight material. In another aspect of the invention slurries are formed for fuel purposes utilizing coal particles with hydrocarbons and water and the aforesaid agent and material to achieve a stable combination or non-combustible materials with water alone or in conjunction with other liquids using the aforesaid agent and material. The present invention also is useful as transportation agents in pipelines, to lower pumping costs.

26 Claims, No Drawings

HYDROCARBON-WATER FUELS, EMULSIONS, SLURRIES AND OTHER PARTICULATE MIXTURES

This application is a continuation-in-part application of our co-pending U.S. application Ser. No. 771,272 now abandoned, filed on Feb. 23, 1977.

Hydrocarbons and water mixtures have many potential uses, such as in internal combustion engines and as a fuel for heating purposes, either in themselves or combined with coal in a coal slurry, or when combined with combustible or non-combustible solids or even with water or oil as the sole liquid.

It is believed that emulsions of hydrocarbons and water have not come into general use because of the relative instability of emulsions involving agents in the fuel in economical quantities. However, the need for increasing the stability of emulsions of hydrocarbons and water has become even more important with the increasing price of fuel.

For many years it has been the practice to inject water into fuel systems for purposes of improving engine performance. It has also been recognized that water injection will enable combustion to occur at a lower temperature, thereby decreasing the formation of oxides of nitrogen, which are major pollutants.

In preparing satisfactory emulsions of hydrocarbons and water, it is necessary that the resulting product have satisfactory properties for use in the internal combustion engine. However, with heating uses, the fuel is normally fed into or atomized in a heating chamber. Moreover, it is necessary that any emulsion used as a heating fuel have sufficient stability to retain its properties until the time comes for its use. It has been proposed to add coal to oil including crude oil, but such proposals have thus far proved unsuccessful because of the inability to maintain the coal in a stable suspended state in the oil for the usual passage of time between manufacture and commercial use.

It is accordingly a principal object of the present invention to provide emulsions of increased stability of hydrocarbons and water for general fuel use, either with an internal combustion engine, for heating purposes, for jet engines and turbines or general use. Also, contemplated are slurries, such as coal slurries which can be readily transported.

It has been recognized that hydrocarbon-water emulsions can be formed using surfactants as disclosed in U.S. Pat. No. 3,527,581. It has also been proposed to use blends of polyoxyethylene emulsifiers in a paper by Peters and Stebar entitled "Water-Gasoline Fuels-Their Effect on Spark Ignition Engine Emissions and Performance" which was presented at the Society of Automotive Engineers, Inc., St. Louis, Mo., on June 7-10, 1976. Such emulsions contain substantial amounts of water, but are either not stable over long periods of time or require such high quantities of emulsifiers to achieve satisfactory stability as to be uneconomical.

Additional teachings of hydrocarbon-water emulsions for various purposes are disclosed in U.S. Pat. Nos. 3,206,410, 3,311,561, 3,346,494, 3,442,842, 3,355,394, 3,645,903 and 3,876,391.

The emulsions of the present invention are preferably water and gasoline, jet fuel, heating oil, diesel oil, crude oil, coal slurries and non-combustibles.

In accordance with the principles of the present invention, the suspended droplets and/or particles are relatively large and have a size usually in excess of about 1400 Angstroms. Thus, the emulsions of the present invention are more properly termed macroemulsions and have a milky appearance or black when coal is used. This is to be compared with microemulsions wherein the internal phase is present in a much smaller droplet and/or particle size so that a microemulsion has a translucent or transparent appearance.

With the present invention the continuous phase is at times the hydrocarbon so that the emulsions are so-called water-in-oil emulsions. Other times the continuous phase is water so the emulsion is oil-in-water.

Where the water percentage is less than 30% by weight, it can be regarded as a low internal phase ratio. In the range of 30% to 70% water by weight, it is present as a medium internal phase ratio and above 70% as a high internal phase ratio system, when water is the internal phase.

One of the advantages offered by the emulsions of the present invention is the great stability over long periods of time, usually well in excess of two months which satisfies usual storage and transportation requirements. Moreover, the viscosity of certain of the emulsions of the present invention is relatively low (about 1 centipoise), although the sedimentation of an emulsion (and therefore its instability) increases as viscosity is lowered. However, the present invention presents a satisfactory balance of high stability and low viscosity. In other applications of invention, high viscosity as well as high stability are afforded. Also, with the present invention satisfactory vaporization is achieved under conditions of reasonably low viscosity and satisfactory stability.

Another characteristic of the invention is that it is usual to have water present in an amount of about 1 to 20% volume with the upper limit reaching 40% by volume or more.

The emulsions of the present invention are achieved by using the combination of (1) a water or hydrocarbon soluble (ionic or noionic) relatively low molecular weight agent (molecular weight in many instances of the order of 1000) which is generally a substance wherein one side or part of the molecular is hydrophillic and the other side is lipophillic (hereinafter known as hydrophillic-lipophillic agent) and (2) a high molecular weight material (of the order of 500,000 or more) that is swellable in water (cross-linked) and/or is water soluble (substantially non-cross-linked).

The combination of the agent and the high molecular weight material creates an extremely stable bond between the water and the hydrocarbon. At the same time, in many instances, the aforesaid combination achieves a low viscosity even where the water is present in excess of 25% by volume. It will be seen that the present invention also contemplates the use of one or more agents, or one or more high molecular weight materials, or a combination of two of one material and one of the other, or vice versa, or two or more of each material.

The present invention is believed to function satisfactory with a wide range of hydrocarbons and particularly various gasolines of high or low octane and other well known fuels. However, the present invention also applies to other hydrocarbons and other carbon containing materials such as coal or even non-hydrocarbons such as carbon or even inorganic materials and incombustibles which may be introduced or dispersed in oil as a coal slurry with the dispersed particles being present in a size smaller than 60 mesh and preferably 200 to 325 mesh. When the present invention is used in connection with oils for heating purposes, it is demonstrated that many well known heating oils, such as #1, #2 or #6 may be used in a water and oil emulsion with suspended coal and/or carbon particles or other particles, both combustible and non-combustible. Examples of non-combustibles are lime, chalk, alumina and others.

Because the emulsions prepared in accordance with the present invention are extremely stable, such emulsions are usable in the same way as presently available furnace heating oil. Moreover, coal particles can be suspended and held suspended in the emulsion with coal present in as much as 50% by weight and sometimes in an even greater amount. Also, the presence of water in the emulsion may improve combustion performance because of the micro-explosions as discussed hereinafter.

In some instances the coal can be suspended in water through the practice of the present invention with the use of little or no oil at all.

A very important consideration arising from the present invention is that the presence of water in the stable emulsion serves to create micro-explosions of water when the emulsion of the present invention is used in an internal combustion engine or in a heating system. Such micro-explosions arise from the superheating of the water in the emulsion. The effect achieved is the blowing of the oil particles apart throughout the hydrocarbon. It is believed that the aforesaid micro-explosions have the effect of substantially increasing the performance of the combustion process.

In heating or use in a diesel engine the oil is normally simply fed into or atomized in a heating chamber or injected therein. Thus, the present invention has use for heating or diesel engine purposes and is especially attractive in the formation of stable coal slurries.

Another contemplated use of the present invention is with a herbicide or a plant growth regulator which will be collectively referred to as an agriculturally active agent. An example of an agriculturally active agent usable with the present invention and water to form a stable emulsion is 2,4D.

One agent used in connection with the present invention is sold by the American Cyanamid Company and is identified as product OT-100. This agent is the sodium salt of dioctylsulfosuccinnic acid. A second agent usable in connection with the present invention is the sodium salt of decylbenzensulfonic acid. A third agent is Toximul MP (sulfonate/non-ionic blend) sold by the Stepan co. This is calcium dodecyl benzene sulfonate and alkyl phenoxy polyoxyethylene ethanol. A fourth agent is Triton X45, sold by the Rohm & Haas Company, which is octylphenoxypolyethoxy ethanol.

Examples of high molecular weight materials usable in the present invention are Carbopol 941 either in acid form or in the completely neutralized form using sodium hydroxide, sodium carbonate, ammonia and other well known neutralizing agents, in stochiometric amounts or otherwise. Carbopol 941 is a high molecular weight polyacrylic acid as disclosed in U.S. Pat. No. 2,798,053. A second example of a high molecular weight material is an acrylamide/sodium acrylate identified as Dow XD 8992 as disclosed in U.S. Pat. No. 3,669,103 and is particularly crosslinked.

A third example of a high molecular weight material is a hydrolized starch polyacrylonitrile graft copolymer as disclosed in U.S. Pat. No. 3,935,099. A fourth example of a higher molecular weight material is a high molecular weight polyoxyethylene coagulant of Union Carbide Company, where the molecular weight is in excess of five hundred thousand.

Yet another advantage of the present invention lies in the fact that relatively small amounts of the agent and high molecular weight materials are used. Indeed an effective amount of the agent can be as low as 3.7 grams per liter of gasoline, down to as low as one gram per liter or slightly less. In some instances it is desirable to combine two of the aforementioned high molecular weight materials such as the Carbonpol 941 (in the form of the sodium salt or otherwise) and the Dow XD 8992 in formulating the stable emulsion of the present invention. In any event, the present invention contemplates, irrespective of the particular high molecular weight material and low molecular weight agent being employed, that in many cases relatively small quantities of the high molecular weight material and low molecular weight agent may be used to achieve a highly stable mixture. This, of course, constitutes a significant advantage of the invention in terms of achieving a highly stable mixture at a relatively low cost. It has been found that the high molecular weight agent may be present in quantities as low as 100 ppm, total weight mixture, but concentrations in the neighborhood of 1000 ppm are generally preferred as a minimum. With reference to the low molecular weight agent, a minimum concentration of 500 ppm is acceptable in some cases, but the generally preferred minimum is about 1000 ppm. Of course, there are some mixtures involving certain components which will require significantly higher amounts of stabilizing materials as can be determined by ordinary experimentation.

The agent is added directly at times to the hydrocarbon with the high molecular weight material in aqueous solution or mixture then added to the hydrocarbon agent solution. In some instances, for example when using Triton X45, it is added to the water, rather than to the hydrocarbon because of the special solubility of Triton X45. This is followed by gentle mixing at room temperature immediately, or for some short period of time, usually not more than fifteen minutes to achieve a white or milky macroemulsion. The emulsions achieved through the present invention are so stable as to remain intact under short term centrifuge tests and temperature tests and shortage tests for periods of time of sixty days or more as required by industry.

When used in a coal slurry, it is possible to use less liquid hydrocarbon or none at all because coal, carbon particles or other particulate heat giving material may be added to enhance the heat value of the emulsion. For example, an emulsion produced in accordance with the invention for heat purposes is composed of 50% by weight coal, 40% by weight heating oil and 10% by weight water. Alternatively, another coal slurry produced in accordance with this invention is composed of 50% by weight of water and 50% by weight of coal, although the amount of coal can be even greater. Also, bituminous coal, lignite and solvent refined coal may be used.

It should be kept in mind that in formulating emulsions in accordance with the present invention that the use of greater amounts of the higher molecular weight material generally allows the use of smaller amounts of the agent. This is important where the quantity of the high molecular weight material is less expensive than the quantity of the agent. From the examples in the specification of this application, it will be seen that relatively low quantities of both the high molecular weight material and the agent are used so that emulsions prepared in accordance with the invention are competitively priced. Thus, where the agent is present in relatively low levels, the high molecular weight material is effective to lower the amount of the agent that is needed. However, at higher levels of agent, it tends to dominate the high molecular weight material to the extent that in some cases the agent alone will produce a satisfactory, albeit extremely expensive emulsion.

It has also been observed that emulsions are more rapidly formulated when the higher molecular weight material is of the swellable type. Moreover, with the increase of water in the internal phase, that is from low to medium or medium to high, viscosity will increase. Conversely, where the water is in the external phase, an increase of water will lower viscosity.

From the foregoing, it can be seen that the emulsions of the present invention are more stable and are macro-emulsions which give rise to micro-explosions when consumed, to achieve better engine and/or burning efficiency. Moreover, with the present invention, coal including bituminous coal, lignite and solvent refined coal and other combustible materials like carbon particles or non-combustible materials can be stabilized for a long period of time for transportation or storage.

Where desired, the viscosity and volatility can be adjusted using suitable materials or solvents, such as alcohols, like methyls, ethyl or isopropyl alcohol, ketones such as acetone, ethers, etc.

It is theorized that the high molecular weight material provides a generic matrix structure or has the effect of structuring the overall mixture in order to hold very tightly the various components. While Applicants do not wish to be bound by any particular theory, it is believed that the high molecular material of the present invention provides a matrix wherein the water is usually latched onto the matrix with the agent acting as a hook between the water phase and the hydrocarbon phase. Stated more broadly, the theory is that the present invention provides a matrix wherein the water has an affinity for the matrix with the agent having an affinity between the water phase and the hydrocarbon phase.

While in many instances the water is structured or functions as a matrix, the hydrocarbon can also be structured.

It is also contemplated that the agent be present in either the water or hydrocarbon phase or both.

It is also contemplated that other additives may be included, such as sodium chloride and other salts, the presence of which prevents the formation of a high internal phase ratio material.

Certain examples of the invention will now be provided for the sake of illustration and not by way of limitation. In these examples certain abbreviations have been used.

The low molecular weight agent will have the following abbreviations:

S1 American Cyanamid Company OT-100—sodium salt of dioctylsulfosuccinnic acid.
S2 Arco Chemical Company—Ultrawet DS—sodium salt of decylbenzenesulfonic acid.
S3 Stepan Company—Toximul MP—calcium dodecyl benzene sulfonate and alkyl phenoxy polyoxyethylene ethanol.
S4 Rohm & Haas Company—Triton X45—octylphenoxypolyethoxy ethanol.
S5 Imperial Chemical Company, Inc. (ICC U.S.) Arlacel C Sorbitan sesquioleate.
Imperial Chemical Company, Inc.—Tween 40 polysorbate 40 (polyoxyethylene 20 Sorbitan mono palmitate).
S5 Proctor & Gamble (Ivory liquid detergent) U.S. Pat. Nos. 3,024,273, 3,179,598, 3,179,599 and 3,793,233.
S8 Stepan Chemical—Ninate 401—Calcium dodecyl benzene sulfonate
S9 Stepan Chemical—(Ninate 411)—alkylamine dodecyl benzene sulfonate (burns completely—contains no metal).
S10 BASF Wyandotte Co.—(ES 7071 AS)
S11 BASF Wyandotte Co.—(ES 7071)
S12 BASF Wyandotte Co.—Plurodot—(HA 430)
S13 BASF Wyandotte Co.—Plurodot—(HA 450)
S14 BASF Wyandotte Co.—(ESO 14734)
S15 BASF Wyandotte Co.—Pluropac—(D-25)
S16 BASF Wyandotte Co.—Pluropac—(T-55)
S17 BASF Wyandotte Co.—(E8 7312)
S18 ICI (Imperial Chemical Industries)—IL-540 (settled) and (mixed)
S19 Diamond Shamrock Co.—(Fuelspere 55)
S20 Diamond Shamrock Co.—(Modicel VD)
S21 General Electric Co.—(SF 1066 Silicone)
S22 Diamond Shamrock Co.—(Fuelsperse 70)
S23 Diamond Shamrock Co.—(Fuelsperse 042)
S24 Monsanto Chemical Co.—(MTS 2049)
S25 Monsanto Chemical Co.—(MTS 2050)
S26 Monsanto Chemical Co.—(MTS 2052)
S27 Monsanto Chemical Co.—(MTS 2053)
S28 Monsanto Chemical Co.—(MTS 2054)
S29 Stepan Co.—(Makon 14)
S30 Stepan Co.—(Makon 4)
S31 Stepan Co.—(Makon 30)
S32 Stepan Co.—(Makon 8)
S33 ICI (Imperial Chemical Company—(IL 540) (new)
S34 Monsanto—(MTS 2056)
S35 Monsanto—(MTS 2057)
S36 Stepan Chemical Co.—(Stepantan-A)

The high molecular weight material will have the following abbreviations:

Q1 Dow Chemical Company XD 8992 (1300 swellable poly (acrylamide/sodium acrylate) partially cross-linked as discussed in U.S. Pat. No. 3,669,103.
Q2 General Mills Company SG-P 502S swellable hydrolyzed starch polyacrylonitrile graft copolymer as disclosed in U.S. Pat. No. 3,935,099.
Q3 B F Goodrich—Carbopol 941 —water soluble high molecular weight polyacrylic acid as disclosed in U.S. Pat. No. 2,798,053 in the completely neutralized form using sodium hydroxide, sodium carbonate or ammonia or other bases in stochiometric amounts or otherwise.
Q4 Union Carbide Company—Polyox Coagulant (MWM more than 500,000) polyoxyethylene
Q5 Dow Chemical Company—Separan MG 700 partially hydrolized polyacrylamides as discussed in U.S. Pat. No. 3,825,069.
Q10 Irradiated carbose (gamma carbose)—This was prepared by starting with Carbose (sodium carboxymethylcellulose). Manufactured by BASF Wyandotte Co. The Carbose IM was exposed to gamma radiation and the Carbose (which is a polymer) becomes cross-linked. The gamma radiation was obtained by using a betatron—20 MEV (million electron volts) gamma rays for 1 hour. This compound will be referred to hereinafter as irradiated polymerized sodium carboxymethylcellulose.

Q14 Polybutadiene—(oleophilic)

Q15 Polyvinyl acetate—(oleophilic)

Q16 Polystyrene—(oleophilic)

Q18 Stasorb 372—A. E. Staley Co. (similar to $Q_2$). See page 23 of Chemical & Engineering News, Nov. 5, 1979

Also usable in the present invention are transportation compositions which facilitate movements of the various emulsions, slurries, etc. through piping, pumps and pumping requirements by lowering pipe friction. The transportation agent is used in a pre-treatment step prior to pumping. One example is the use of Q4 as a pre-treatment in the pipe or as incorporated in the mixture. Also usable in the present invention are transportation materials and agents selected from one or more of the S's and Q's specified above but not limited thereto.

The concept of "transportation" referred to hereinabove is particularly directed to the transportation of oil or coal oil mixtures or coal, oil and water mixtures through pipe lines over long distances. As a general aspect, the invention is quite useful as a lubricant for container surfaces and conduits in general. The use of certain aspects of the present invention, as will now be described, substantially lowers the pipe friction in order to greatly reduce pumping requirements.

It has been found that S* materials alone are fairly good transportation adding (hereinabove referred to as transportation) materials. The S material can be incorporated into the body of the fluid solution or mixture being transported or can be applied in a precoating step to the inside wall of the pipe. It is preferred that the S material in water solution or in a emulsion or other transportation agent be applied by direct injection into the pipe or other conduit container at various pumping stations along the length of the pipe.

As such, the transportation agent generally has a lubricating function, and can be regarded as a lubricant.

It has been further found that a combination of Q's and S's will act as a transportion agent as well as a stabilizing agent. For instance, an emulsion* of gasoline and water or kerosene and water can be prepared using various combinations of Q's and S's in accordance with the present invention. This technique involves injecting the aforesaid emulsion of the Q and S material as a lubricant into the pipeline at pumping stations along the pipeline. Where the S material is used alone, it is used as a solution of the S material in water.

*having an S and Q material at a combined concentration of at least 1000 ppm of total emulsion weight.

It has been further found as a part of the present invention that silicates, such as sodium or potassium silicate are quite useful, either alone or in combination with certain S materials as transportation agents. One aspect of this feature of the invention involves blowing a water solution of slicates through the pipe in a pre-coating stage. Another aspect of the invention involves preparing a water solution or emulsion involving a silicate and a Q and a S and then blowing the entire mixture through the pipeline or injecting the same into the pipeline at pumping stations along the pipeline. In making up a solution of silicate, Q and S, it has been found that the silicate should be present in an amount of at least 1000 ppm concentration based on the total weight of the solution or emulsion. A preferred material is S9 when used with silicates only. For coal and oil mixtures or coal, oil and water mixtures, the use of Q4 by itself has a transportation agent has also been quite satisfactory.

The preferred silicate is sodium silicate wherein there may be two, three or four molecules of solicon dioxide to one molecule of disodium oxide.

In the following Examples the gasolines are:

(A) American Oil Co. (AMOCO) Premium (No lead) av. octane #=95.7 $H_2O$ means distilled water.

(B) Same as above, but sub-regular (No lead) average octane #=88.0.

EXAMPLE 1

75 Parts by volume of Gasoline A containing 3.75 g/lit. of OT-100 of American Cyanamide were shaken with 25 parts by volume of water, containing 0.7 g/lit. of Dow Chemical Company's DX-1300 and 0.5 g/lit. of Na-941-carbopolate of B F Goodrich Chemical Co. A stable emulsion of gasoline/water was produced; on standing for one month at room temperature no noticeable separation took place; however, after 4.0 months a water layer, equalling 3.7 volume % of the total liquid appeared; after 9.0 months the separation of the aqueous layer was 5.6 volume % of the total liquid. The foregoing mixture was used as a fuel in a single cylinder internal combustion engine. Before use, viscosity was lowered by the addition of ethyl alcohol (10% by volume). The engine operated satisfactorily under full load for an extended period of time.

EXAMPLE 2

90 Parts by volume of gasoline B containing 3.75 g of OT-100 of American Cyanamide Co./lit. gasoline were shaken with 10 parts by volume of water containing 1.0 g/lit. of a water swellable polymer SGP-5025 of General Mills Chemicals, Inc. producing a stable milk-like emulsion of gasoline/water. There was no separation of an aqueous layer after 30 days and after 100 days an aqueous lower layer approximately 0.5% of the total liquid accumulated.

EXAMPLE 3

75 Parts by volume of gasoline A containing 3.75 g/lit of gasoline of OT-100 were mixed and shaken with 25 parts by volume of water containing only 1.0 g/lit. solution of Na-941-carbopolate. It formed a stable milk-like emulsion so that in 2 weeks no aqueous layer separated and after 100 days 3.3 volume percent of the total liquid separated.

EXAMPLE 4

Similar to Examples 1, 2 and 3 emulsions were prepared with the same agents and materials but using instead of gasoline:

(a) Fuel Oil No. 1

(b) Fuel Oil No. 2

(c) Jet engine Fuel JP4

(d) Angolan Crude Oil as is.

All of these four types formed stable emulsions, similarly to those of examples 1, 2 and 3.

EXAMPLE 5

50.0 Parts by weight of No. 2 fuel oil, containing 3.75 g/lit of OT-100 of American Cyanamide were mixed with 30.0 parts by weight of bituminous coal passing a 325 mesh sieve, into a black ashalt-like liquid, after adding 1.65 parts by weight of isopropyl alcohol to wet part of the coal powder. 20.0 Parts by weight of water containing both 1 g/lit. of sodium 941-carbopolate of B F Goodrich Chemical Co. and 1 g/lit. XD-8992 of Dow Chemical Co. were mixed in by stirring and a 30% weight of coal. (20% weight water) (50% fuel oil slurry produced). It exuded only 3 weight percent of fuel No. 2 after standing for 45 days at room temperature (r 20° C.) and after a temperature cycle of 27 hours at −12° C.) and after a temperature cycle of 27 hours at −12° C. and 4 hours at 85° C. to 100° C. to 85 ° C.

EXAMPLE 6

46 parts by weight of the same mesh coal as in Example 5 were mixed with 44-½ parts by weight Crude from Angola (light crude) containing 3.75 g/lit. crude of American Cyanamide's OT-100. To this black liquid 10 parts by vol. of water containing the same ingredients and concentrations as in Example 5 above, were added and stirred with a stirrer to a homogenous black slurry of the composition:

46 w/o (weight percent) coal-9-½ w/o water-44-½ w/o Gulf crude and which persists for long periods of time.

EXAMPLE 7

Speed up of inversion (a) To 20 cc of $H_2O$ was added 80 cc Gasoline B containing Sl (3.75 g/l Gasoline B) and mixed with gentle stirring in a magnet stirrer. The stirring sequence was 15 seconds stirring plus 5 seconds standing or manual swirling. After six such sequences the two separated layers rapidly formed a high internal phase ratio emulsion (gas in water), or an invert.

(b) Repeat (of a) except that 18 cc of water solution containing Q1 (0.63 g/l $H_2O$) was added to 73 cc of Gasoline B with Sl (3.75 g/l gasoline). The emulsion now formed in only two sequences of stirring.

(c) Repeat (of a) except that 20 cc of water solution of Q2 (1 g/l $H_2O$) was added to 80 cc Gasoline B containing Sl (3.75 g/l gasoline). The emulsion now formed in only two sequences of stirring.

EXAMPLE 8

Change of viscosity and stability.

(a) For a 25c water solution Q2 (1.0 g/l $H_2O$) and 100 cc Gasoline B containing Sl (3. 75 g/l gasoline) the sequence of Example 7 c was followed. The emulsion had a viscosity of about 3 centistokes and left a lower layer of 0.84 cc in 6.0 cc total in a centrifuge tube under about 200×g for 5 minutes.

(b) stirring of the sample in (a) of four additional stirring sequences at about twice the stirring speed gave an emulsion viscosity of about 12 centistokes and a centrifuge lower layer (same centrifuge conditions) of about 0.3 cc, i.e. higher viscosity and greater stability with increased rate of shear.

(c) To a 20 cc water solution of Q3 (1 g/l $H_2O$) was added 80 cc Gasoline B containing Sl (3.75 g/l gasoline). The stirring sequence to form an emulsion of the inverted type took 10 sequences of the stirring rate of b) above plus 6 sequences of a combination of that of (a) and (b) above. With four additional sequences of stirring (after inversion) at the speed of (b) above the viscosity of the emulsion was about 25 centistokes, with a centrifuge lower layer of about 0.48 cc in 6 cc total.

(d) For the same composition as in (c) above except that 20 cc Q3 solution was replaced by 10 cc Q2 solution and 10 cc Q3 solution. A viscosity of 13 centistokes and a centrifuge lower layer of about 0.48 cc in 6 cc total was obtained. The emulsion was formed in only three sequences of the stirring rate of (b) above. This shows the synergistic effect of Q2 on rate of emulstion formation and Q3 on viscosity.

(e) To 25 cc solution of 1:1 Q1 and Q3 and one liter of water (1 g/l $H_2O$) each was added 75 cc Sl (3.75 g/l gasoline A). This solution was stirred at five times the stirring rate of Example 7 a) to produce an emulsion with a viscosity of about 50 centistokes and a centrifuge sedimentation of about 0.12 cc. This sample was allowed to stand in a flask and showed no appreciable separation for three months, after which about 0.1 cc of water separated from about 100 cc of emulsion over an additional month. This correllates the short term stability centrifuge test with long term stability, showing that both viscosity and lower layer formation must be used to establish stability, for this emulsion. This shows that the stability of (d) above is greater than (c) although the centrifuge lower layer formation is the same.

EXAMPLE 9

Addition of Q material improves stability.

(a) A composition of 20 cc $H_2O$ and 80 cc gasoline B containing Sl (3.75 g/l) with stirring as in Example 8

(b) gave an emulsion in 9 stirring sequences. Four more similar stirring sequences gave an emulsion with a viscosity of about 4 centistokes and a centrifuge lower layer of 0.54 cc in 6 cc.

(b) This experiment is the same as a) above except that 20 c water solution of Q2 (1 g/l $H_2O$) replaced the 20 cc $H_2O$. A viscosity of about 8 centistokes and a centrifuge lower layer of 0.54 cc in 6 cc were obtained. This increase in viscosity with the Q material shows increased stability over no use of Q material as in (a) above. See remarks at end of Example 8 (e).

EXAMPLE 10

Q's have greatest effect with low concentration of S's (a) To 30 cc $H_2O$ was added 120 cc of gasoline B containing Sl (50 g/l) and following two sequences of stirring as in Example 7 (a) a low internal phase ratio (water in gasoline) was formed. With this composition a viscosity of about one centistoke and a zero centrifuge lower layer was obtained.*

*With this type of emulsion zero centrifuge lower layer formation gave about 1.5% water layer in 7 days for long term stability.

(b) Experiment (a) above was repeated with 30 cc water solution of Ql (1 g/l $H_2O$) replacing the 30 cc $H_2O$. The same type emulsion with the same viscosity and lower layer were obtained as in (a) above. This Example compared with Examples 7, 8 and 9 shows that Q's are most effective with low concentrations of S materials in producing high internal phase ratio emulsions and changing viscosity and thus stability.

EXAMPLE 11

Effect of alcohols, salts $H_2O$/gasoline (Ratio)

(a) A composition of 20 cc water solution $Q_2$ (0.34 g/l $H_2O$) and 80 cc gasoline B (Sl solution concentration grams/1 gasoline B) with 3 minutes of uninterrupted magnetic stirring gave an emulsion with a viscosity of about 4 centistokes and centrifuge lower layer of about 0.7 cc in 6 cc.

(b) With the same composition as in (a) above plus 1.0 cc methanol, only 30 seconds were required to form an emulsion with a viscosity of about 3 centistokes and centrifuge lower layer of 0.9 cc in 6 cc.

(c) With the same composition as in (a) except that 1.2 g of Sl was added to the gasoline and the concentration of Q2 was 1 g/1 $H_2O$ an emulsion was produced in 60 seconds of uninterrupted stirring that gave a viscosity of about 7 centistokes and a centrifuge lower layer of about 0.14 cc in 6 cc.

(d) With the same composition as in (c) above plus 1.0 cc methanol only 15 seconds was required to produce an emulsion with a viscosity of about 3 centistokes and a centrifuge lower layer of about 0.8 cc—comparing (a) with (b) and (c) with (d) shows that methanol decreased the time of emulsification, decreases the emulsion viscosity, and decreases the stability.

(e) A composition of 10 cc water solution $Q_2$ (0.34 g/l $H_2O$) and 90 cc gasoline B containing Sl (3.75 g/l) required five minutes of uninterrupted magnetic stirring to give an emulsion with a viscosity of about 16 centistokes and a centifuge lower layer of about 0.3 cc in 6 cc.

(f) The same composition as in (a) was used with the addition of 0.55 cc $CaCl_2$ (2 g/100 cc $H_2O$) and it was not possible to produce an emulsion.

(g) A composition of 30 cc water solution Q2 (0.34 g/l $H_2O$) and 70 cc gasoline B containing Sl (3.75 g/l) required 2 minutes of stirring to produce an emulsion with a viscosity of about 3 centistokes and a centrifuge lower layer of about 1.1 cc in 6 cc.

(h) A composition of 20 cc water solution Q2 (1 g/l $H_2O$) and 80 cc gasoline B containing Sl (3.75 g/l) formed an emulsion, after 4 stirring sequences (as in Example 7a. This emulsion gave a viscosity of about 3 centistokes and gave a centrifuge lower layer of about 0.19 cc in 6 cc.

(i) Decreasing the quantity of Q2 in H) above to 18 cc and increasing the quantity of NaCl to 2 cc prevented the formation of an emulsion. Comparing (2) with (f) and (h) with (i) shows that salt concentration can prevent a high internal phase ratio emulsion from forming. Comparing (e) with (g) shows that increased water phase gives an emulsion of this composition with decreased viscosity and stability.

EXAMPLE 12

Tests with Q4, S2, S3, S4, S9

(a) A composition of 20 cc water solution Q4 (1 g/l $H_2O$) and 80 cc Sl. (3.75 g/l) required 15 stirring sequences of the type in Example 7(a) and after an invert emulsion was formed 4 additional stirring sequences were added. This gave an emulsion with a viscosity of about 10 centistokes and a centrifuge lower layer of about 0.33 cc in 6 cc.

The composition of (a) above was changed for water phase to 10 cc water solution Q1 (1.5 g/l $H_2O$) plus 10 cc water solution Q4 (1 g/l $H_2O$). The invert emulsion was now formed in 2 stirring sequences. The viscosity remained at 10 centistokes and the centrifuge lower layer changed to 0.42 cc in 6 cc. Comparing (a) and (b) shows similar synergistic effects to that obtained in Example 8(d).

(c) A composition of 20 cc water solution Q2 (l/g/l $H_2O$) plus 80 cc gasoline B solution S2 (3.75 g/l) was stirred for 70 seconds in a magnetic stirrer at about 0.6 maximum stirring rate to produce an emulsion of the high internal phase ratio type. After an additional 30 seconds of stirring the emulsion had a viscosity of about 8 centistokes and a centrifuge lower layer of about 0.8 cc in 6 cc. In the following example NaCl is used to prevent a high internal phase ratio emulsion from forming, so that the following three examples are of the low internal phase ratio type (water in hydrocarbon). In all cases maximum stirring speed of the magnetic stirrer was used. When a Waring Blender was used it was found that the lower layer supernate interface (after) centrifuging was less apparent. In all cases the viscosity of the emulsion was about 1.0 centistoke in the following three tests.

(d) Composition: 3 cc NaCl-water solution (2 g/100 cc $H_2O$ plus 14 cc Q1 water solution (1.5 g/l $H_2O$) plus 14 cc Q3 water solution (1 g/l $H_2O$) plus 90 cc gasoline solution B (3.75 g/l gas B) gave zero centrifuge lower layer in 6 cc and no water separation in seven weeks on standing.

(e) Composition: 18 cc $H_2O$ plus 5 cc water solution Q2 (1 g/l $H_2O$) plus 0.75 cc S4 as is plus 1.5 cc S3 as is 72 cc gasoline B gave same centrifuge results as (d) above.

(f) Composition: 3.5 cc water solution Q1 (1.5 g/l $H_2O$) plus 3.5 cc water solution Q3 (1 g/l $H_2O$) plus 1.0 cc S4 plus 1.5 cc plus 87 cc gasoline B gave a centrifuge lower layer of about 0.06 cc in 6 cc.

(g) An invert emulsion was formed with 10 cc water solution Q1 (0.5 g/l $H_2O$) plus 90 cc Angolan crude (containing 4 g S1/1 crude). Less than 3 cc of $H_2O$ separated in 6 days.

(h) A high internal phase ratio material was prepared with 9 cc water solution Q1 (1.5 g/l $H_2O$) plus 50 cc #2 oil (with 4 g S1/1 #2 oil) and stirring in a magnetic stirrer at 1/5 and 3/5 full scale. With the addition of an additional 40 cc of 190 2 oil (with same concentration of S1) the emulsion remained stable.

(i) An emulsion of the type in (h) above was made with 5 cc water solution Q1 (1.5 g/l $H_2O$) plus 5 cc water solution Q3 (1 g/l $H_2O$) plus 40 cc 190 2 (with 0.25 S9) and the same stirring sequence. This emulsion was broken with the addition of 40 cc more of 190 2 oil and stirring. The emulsion was reformed with the further addition of 0.25 g of S9 with additional stirring. This emulsion was stable, with no water separation, for more than 19 days.

(j) A stable coal-oil-water slurry was prepared with 5 cc water solution Q1 (1.5 g/l $H_2O$) plus 5 cc water solution Q3 (1 g/l $H_2O$ plus 11 cc of 190 6 oil (viscosity of 126 Furol at about 120° F.) plus 0.5 cc S9 plus 80 g Bituminous coal (−200 mesh, 190 6 Illinois). Preparation was by hand for the first 60 g of coal and was stirred (600 r.p.m.) for the 80 grams of coal, with a glass stirrer, while the material was elevated in temperature of about 130° F., for 14 minutes of stirring. The slurry was then placed in a plastic syringe for sectioning at a later date, to determine settling.

EXAMPLE 13

(a) Ten cc of $H_2O$ was mixed with 100 cc of #6 oil (126 Furol at 120° F.) with a glass stirrer at about 600 r.p.m. for 5 minutes. When 60 cc of this oil (no water) is passed through a reference funnel at 23° C. it took 300 seconds to obtain a thin filament of oil and an additional 30 seconds before the end of the pour. With the water addition the oil drained from the side of a glass graduate at 23° C., in about 1.0 hour.

(b) A composition and procedure described in (a) above was followed except that the 10 cc of $H_2O$ was replaced by a water solution of 1 to 1 Q1 and Q3, with a concentration of 1.5 g/l $H_2O$ for Q3, plus about 0.3 g of S9. The funnel test gave 25 seconds to filament and an additional 30 seconds to end of pour. The separation from the walls of the glass container took about 1.0 seconds (at 23° C.); for about 90% of the poured material. Parts (a) and (b) demonstrate that the addition of Q and S materials change the pour ability of 190 6 oil, radically.

EXAMPLE 14

A composition of 3 cc $H_2O$ plus a 7 cc $H_2O$ solution of Q1 (1.5 g Q1/1 $H_2O$) plus 91.5 cc of gasoline B plus 0.5 cc S9, was formed in a Waring blender operating at ½ full speed for 5 minutes. This composition and procedure produced a very stable low internal phase ratio emulsion of water in gasoline. Less than 0.1 cc in 90 cc of a viscous water layer was deposited at the bottom of the containing cylinder.

Although the present invention has been disclosed with emphasis upon hydrocarbon and water mixtures with coal combustibles or non-combustibles or as involving water or coal or oil and coal, it is contemplated that the agent and the high molecular weight material will achieve stable mixtures involving other materials or facilitate the transportation thereof.

Also, even the hydrocarbon water mixture or other mixtures of the present invention can be readily transported or held in stable condition for purposes of the combustion in the classical sense. For instance, the product of the invention can be used in the petrochemical industry where the mixture can be separated into components and such components utilized for their chemical or other value.

The present invention is also useful in maintaining the stability of a mixture of 90% gasoline and 10% alcohol, known as gasahol. Whenever water (from rainfall or otherwise) enters a tank of gasahol, it has been found that the water will tend to draw the alcohol out of the gasahol solution. With the passage of time, the quantity of alcohol and water solution will accumulate at the bottom of a tank while gasoline (without water) goes to the top of the tank. This set-up will provide poor engine performance if the alcohol-water at the bottom of the tank is eventually drawn by the gasoline pump for combustion purposes into the engine. With the present ivention, stability of the gasahol is maintained at all times, even when the water gets into the tank since water will not hinder the gasoline-alcohol mixture that is stabilized with the addition of a Q-S pair. Clearly, the present invention is operative even where the relative presence of alcohol is greatly increased up to and beyond the point where alcohol is present in an amount greater than the gasoline.

Without further elaboration the foregoing will so fully illustrate our invention that others may, by applying current or future knowledge, readily adapt the same for use under various conditions of service.

What is claimed as the invention is:

1. In a mixture of water and a substance selected from the group consisting of oil and gasoline, the improvement comprising maintaining the stability of such mixture with reference to separation into continuous phases, through the addition thereto of a relatively low molecular weight hydrophilic-lipophilic agent and a high molecular weight swellable material, having a molecular weight of at least 500,000.

2. The mixture of claim 1 wherein the substance is heating oil.

3. The mixture of claim 1 with the further addition of coal.

4. The mixture of claim 1 with the further addition of lignite.

5. The mixture of claim 1 wherein the substance is crude oil.

6. The mixture of claim 1 used as a pour point depressant.

7. The mixture of claim 1 wherein the agent is sodium salt of dioctylsulfosuccinnic acid.

8. The mixture of claim 1 wherein the agent is sodium salt of decylbenzenesulfonic acid.

9. The mixture of claim 1 wherein the agent is calcium dodecyl benzene sulfonate and alkyl phenoxy polyoxyethylene ethanol.

10. The mixture of claim 1 wherein the agent is octylphenoxypolyethoxy ethanol.

11. The mixture of claim 1 wherein the agent is alkylamine dodecyl benzene sulfonate.

12. The mixture of claim 1 wherein the high molecular weight material is swellable poly (acrylamide/sodium acrylate) partially crosslinked.

13. The mixture of claim 1 wherein the high molecular weight material is swellable hydrolyzed starch polyacrylonitrile graft copolymer.

14. The mixture of claim 1 including at least a second material having a molecular weight of a least 500,000.

15. The mixture of claim 14 wherein the agent is sodium salt of dioctylsulfosuccinnic acid and the high molecular weight material is a mixture of swellable poly (acrylamide/sodium acrylate) partially crosslinked and water soluble high molecular weight polyacrylic acid in the completely neutralized form.

16. The mixture of claim 15 with the further addition of coal.

17. The mixture of claim 14 wherein the agent is sodium salt of dioctylsulfosuccinnic acid and the high molecular weight material is a mixture of swellable hydrolyzed starch polyacrylonitrile graft copolymer and water soluble high molecular weight polyacrylic acid in the completely neutralized from.

18. The mixture of claim 14 wherein the agent is sodium salt of dioctylsulfosuccinnic acid and the second high molecular weight material is partially hydolized polyacrylamides.

19. In a mixture of coal and water, the improvement comprising maintaining the stability of such mixture with reference to separation into continuous phases through the addition thereto of a relatively low molecular weight hydrophilic-lipophilic agent and a high molecular weight swellable material, having a molecular weight of at least 500,000.

20. In a mixture of coal and oil, the improvement comprising maintaining the stability of such mixture with reference to separation into continuous phases through the addition thereto of a relatively low molecular weight hydrophilic-lipophilic agent and a high molecular weight swellable material, having a molecular weight of at least 500,000.

21. A stabilizer to maintain stability of a mixture with reference to separation into continuous phases, having at least one ingredient, said stabilizer comprising a relatively low molecular weight hydrophilic-lipophilic agent and a high molecular weight swellable material, having a molecular weight of at least 500,000.

22. In a mixture of water, and a substance selected from the group consisting of oil and gasoline the improvement comprising maintaining the stability of such mixture with reference to separation into continuous phases through the addition thereto of a relatively low molecular weight hydrophilic-lipophilic agent having a molecular weight of from 225 to 10,000 and a high molecular weight swellable material, and wherein the molecular weight of said material is at least 500,000.

23. The process of claim 1 wherein said high molecular weight material is irradiated polymerized sodium carboxymethylcellulose.

24. The mixture of claim 1 wherein very small amounts of said material are used.

25. The mixture of claim 1 including at least a second agent.

26. The mixture of claim 18 with a further addition of a substance selected from the group consisting of oil and gasoline.

* * * * *